United States Patent
Lo et al.

(10) Patent No.: US 8,065,452 B1
(45) Date of Patent: Nov. 22, 2011

(54) MULTIFUNCTIONAL UNIVERSAL SERIAL BUS WIRELESS KEYBOARD

(75) Inventors: Sheng Hsin Lo, Taipei (TW); Chia Ching Lien, Taipei (TW); Jia Shiung Kuo, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/914,593

(22) Filed: Oct. 28, 2010

(51) Int. Cl.
*G09G 5/00* (2006.01)
*G06F 3/02* (2006.01)
*G06F 13/12* (2006.01)

(52) U.S. Cl. ............. 710/62; 345/156; 345/168; 710/73

(58) Field of Classification Search .................. 345/156, 345/168–172; 710/1, 62, 65, 67, 72, 73; 713/1
See application file for complete search history.

(56) References Cited

U.S. PATENT DOCUMENTS

| | | | |
|---|---|---|---|
| 6,687,774 B2* | 2/2004 | Milios et al. | 710/72 |
| 2006/0007126 A1* | 1/2006 | Shih | 345/156 |

* cited by examiner

*Primary Examiner* — Alford W. Kindred
*Assistant Examiner* — Richard B Franklin
(74) *Attorney, Agent, or Firm* — Morris Manning Martin LLP; Tim Tingkang Xia, Esq.

(57) ABSTRACT

A multifunctional universal serial bus (USB) wireless keyboard for operating a control function of a personal computer (PC) is presented. A main body of the keyboard includes a plurality of keys, a signal sending module, and a coding circuit. When the key is pressed, the coding circuit generates a corresponding character signal, and the signal sending module converts the character signal into a radio signal and sends the radio signal. A receiving module receives the radio signal, and transmits the radio signal to the PC. The receiving module further includes a clock control pin and a USB module electrically connected to the PC. An embedded controller is disposed in the PC and electrically connected to the receiving module through the clock control pin, and sends a corresponding function trigger signal to a south bridge chip set according to a pressing time of the received radio signal.

3 Claims, 3 Drawing Sheets

MULTIFUNCTIONAL UNIVERSAL SERIAL BUS WIRELESS KEYBOARD

BACKGROUND OF THE INVENTION

1. Field of Invention

The present invention relates to a wireless keyboard, and more particularly to a multifunctional universal serial bus (USB) wireless keyboard.

2. Related Art

As computer industry develops, various peripheral devices also change rapidly. Especially, an input device (such as a keyboard, a mouse or a touch pad) begins to change from previous wired connection into radio transmission. Due to the radio transmission, a user may easily move and adjust a most comfortable typing environment.

Though a user can conveniently performs various processes such as typing and network surfing, as limited by a signal sending manner of the wireless keyboard, the user cannot directly, for example, power on/off a personal computer (PC) and restore a basic input-output system through a wireless keyboard. The user needs to additionally mount a wired keyboard to achieve the functions above. Therefore, the convenience of the wireless keyboard is lost.

SUMMARY OF THE INVENTION

In view of the problems above, the present invention is directed to a multifunctional USB wireless keyboard for operating a control function of a PC.

In order to achieve the above objectives, the present invention provides a multifunctional USB wireless keyboard, which comprises a main body of the keyboard, a receiving module, and an embedded controller. The main body of the keyboard comprises a plurality of keys, a signal sending module, and a coding circuit. When the key is pressed, the coding circuit generates a corresponding character signal, and the signal sending module converts the character signal into a radio signal and sends the radio signal. The receiving module receives the radio signal, and transmits the radio signal to the PC. The embedded controller is disposed in the PC. A USB module in the receiving module further comprises a clock control pin. The USB module is electrically connected to the embedded controller in the PC, and sends a corresponding function trigger signal to a south bridge chip set according to a pressing time of the received radio signal.

The present invention provides a USB supporting wireless keyboard, by which a user can perform corresponding functions through existing keys and different pressing time. Therefore, the user can complete data restoration or deletion on a motherboard without opening a casing of a PC.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
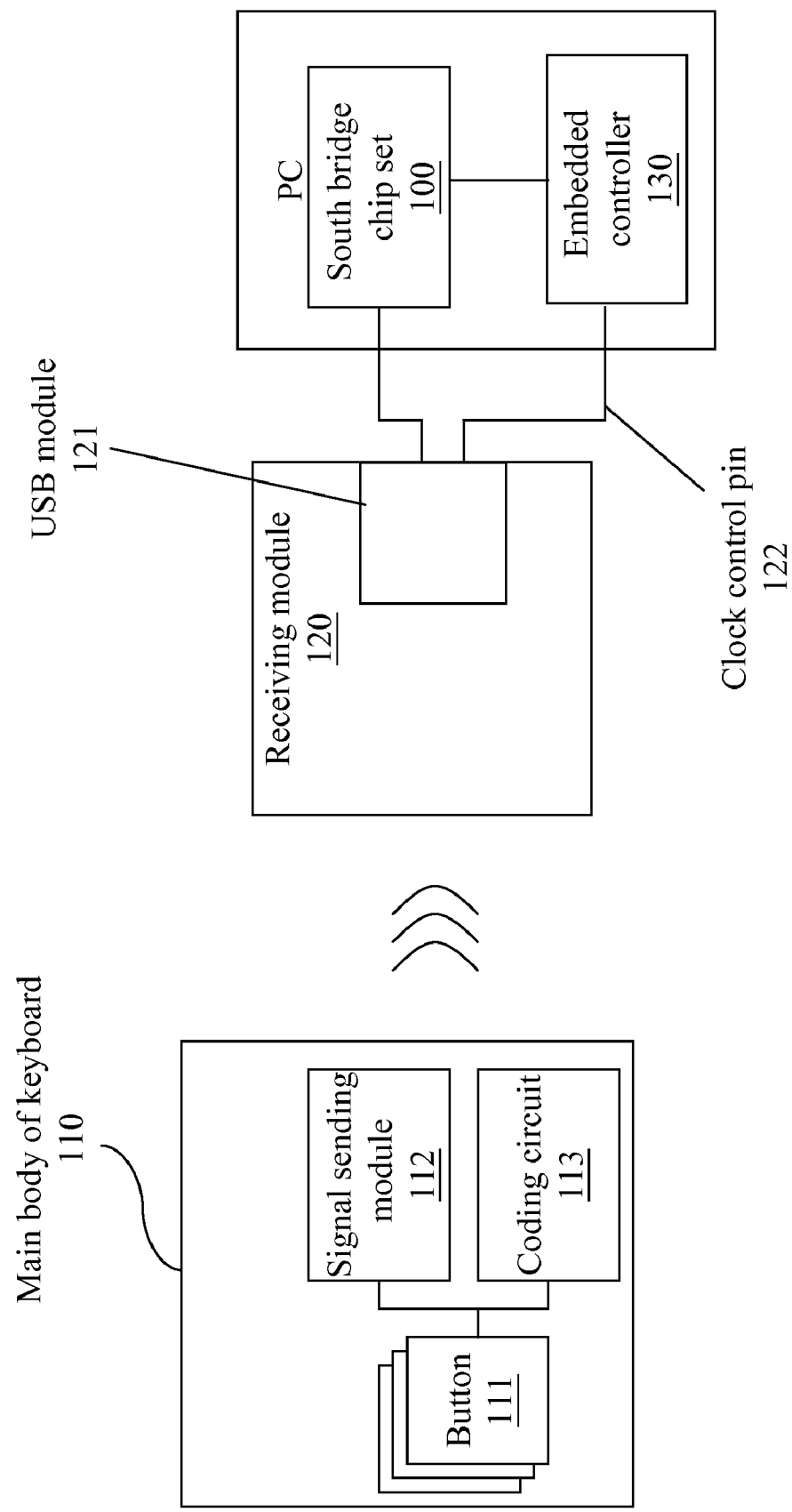
FIG. 1 is a schematic view of architecture of the present invention.

FIG. 1 is a schematic view of architecture of the present invention. As shown in FIG. 1, a USB wireless keyboard of the present invention comprises a main body 110 of the keyboard, a corresponding receiving module 120 of the main body 110 of the keyboard is disposed in a PC, and an embedded controller 130 is further disposed in the PC. The USB is a mini-A type or a mini-B type.

The main body 110 of the keyboard comprises a plurality of keys 111, a signal sending module 112, and a coding circuit 113. When the key 111 is pressed, the coding circuit 113 generates a corresponding character signal. The signal sending module 112 converts the character signal into a radio signal and sends the radio signal to a PC. The coding circuit 113 generates a corresponding function signal according to a different pressing time that the key 111 is pressed.

Figure 2:
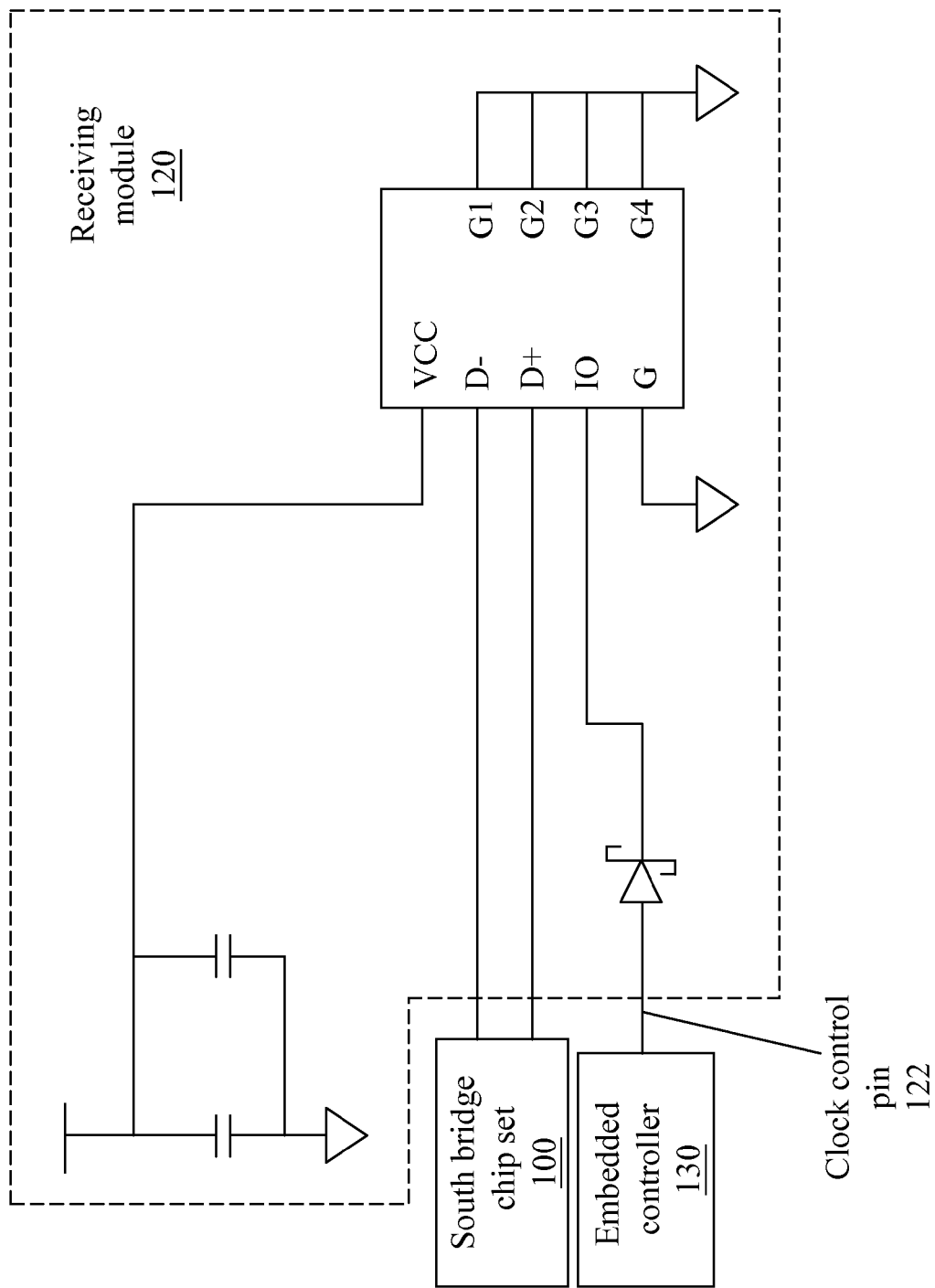
FIG. 2 is a schematic circuit diagram of a clock control pin of the present invention.

The receiving module 120 further comprises a USB module 121 and a clock control pin 122. The receiving module 120 is connected to the PC and the embedded controller 130 through the USB module 121. The clock control pin 122 of the receiving module 120 is connected to the embedded controller 130, and the rest pins of the receiving module 120 are connected to a south bridge chip set 100. The receiving module 120 is used for performing various functions of the PC through the embedded controller 130. In the present invention, a fifth pin (floating pin) of the USB module is used as the clock control pin 122. FIG. 2 is a schematic circuit diagram of a clock control pin of the present invention. As shown in FIG. 2, the clock control pin 122 is used for judging the pressing time of the received radio signal, and sending a corresponding function trigger signal to the south bridge chip set 100.

The embedded controller 130 is disposed in the PC, and electrically connected to the receiving module 120 through the clock control pin 122, and sends the corresponding function trigger signal to the south bridge chip set 100 according to the pressing time of the received radio signal.

Figure 3:
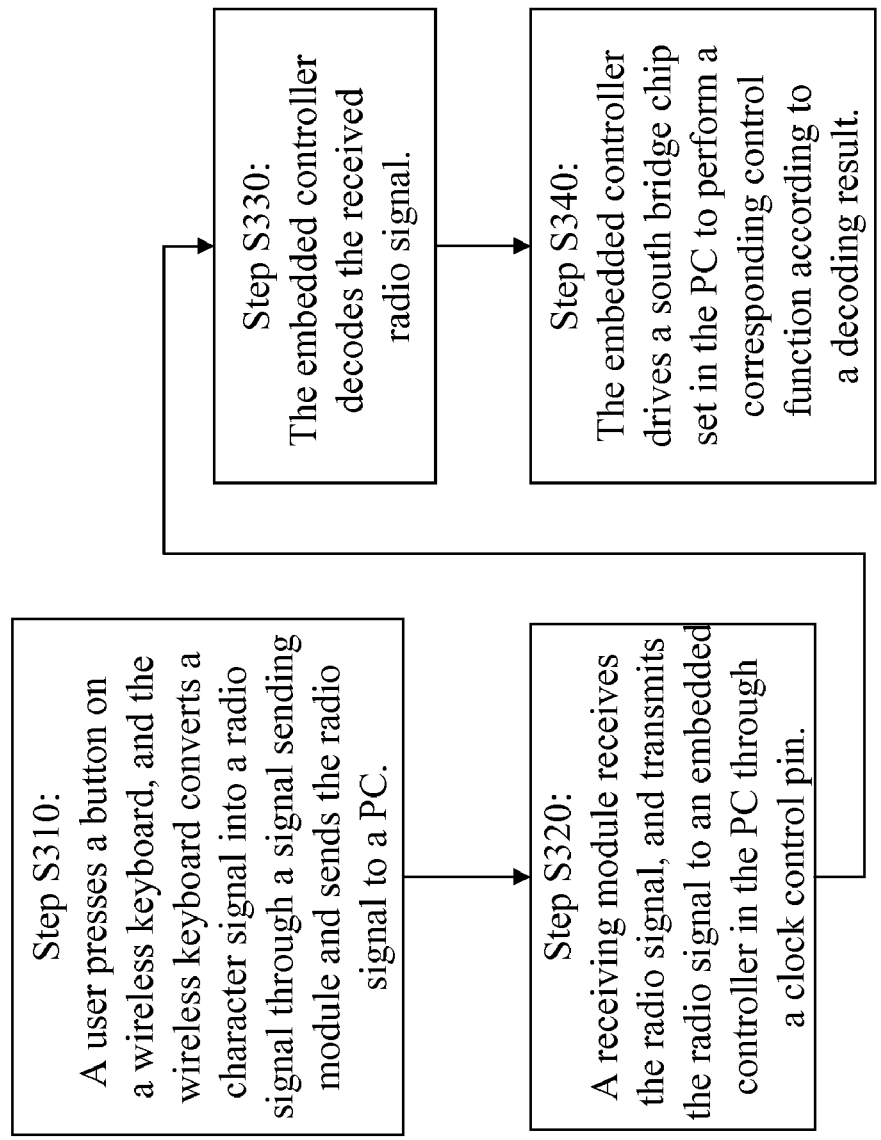
FIG. 3 is a schematic flow chart of operations of the present invention.

FIG. 3 is a schematic flow chart of operations of the present invention. As shown in FIG. 3, the present invention comprises the following steps.

In Step S310, a user presses a key on a wireless keyboard, and the wireless keyboard converts a character signal into a radio signal through a signal sending module, and sends the radio signal to a PC.

In Step S320, a receiving module receives the radio signal, and transmits the radio signal to an embedded controller in the PC.

In Step S330, the embedded controller decodes the received radio signal.

In Step S340, the embedded controller drives a south bridge chip set in the PC to perform a corresponding control function according to a decoding result.

In order to make different pressing time in the present invention clear, various functions are provided in Table 1 for illustration. However, the present invention is not limited thereto.

TABLE 1

Table of control function and corresponding pressing time

| Control Function/Corresponding Hot Key | Pressing Time |
|---|---|
| Volume up (Fn + "3") | 50 ms |
| Volume down (Fn + "4") | 30 ms |
| Burn BIOS in POST (Power key + "F") | 100 ms |
| Open BIOS (Power key + "F2") | 200 ms |
| Open CD-ROM (Fn + "C") | 300 ms |
| Back up hard disk (Power key + "X") | 400 ms |
| Power on (Power key) | 500 ms |
| Open Boot list (Power key + "F12") | 600 ms |

When a PC is powered off (that is, the PC is not powered on), current still flows in a part of components in the PC, so as to ensure operation of these components. For example, in a complementary metal-oxide-semiconductor (CMOS), various settings (such as a system time, device settings or types of peripheral devices) of the PC are recorded. Therefore, the receiving module 120 can maintain an operation state through the current. Accordingly, the present invention is applicable before or after the PC is powered on. After receiving the radio signal, the receiving module 120 of the PC transmits the radio signal to the embedded controller 130. The embedded controller 130 converts the radio signal into a corresponding operation instruction to the PC. Subsequently, the embedded controller 130 drives a corresponding device through the south bridge chip set 100.

An example in which the PC is not powered on is taken for illustration below. When a user presses a function key (correspondingly, the key "Fn") and other keys on the main body 110 of the keyboard, the coding circuit 113 generates a corresponding function signal according to the pressing time of the key 111. For example, when the key Fn and a number key "3" are pressed for 30 ms, the signal sending module 112 sends a radio signal of turning up a volume to the PC. Alternatively, when the key Fn and an alphabet key "C" are pressed for 300 ms, the signal sending module 112 sends a corresponding radio signal of opening a CD-ROM to the PC to drive the CD-ROM to open a disk tray.

The present invention provides a USB supporting wireless keyboard, by which a user can perform corresponding functions through existing keys 111 and different pressing time. Therefore, the user can perform data restoration or deletion on a motherboard without opening a casing of a PC.

What is claimed is:

1. A multifunctional universal serial bus (USB) wireless keyboard for operating a control function of a personal computer (PC), comprising:

a main body of the keyboard, having a plurality of keys, a signal sending module, and a coding circuit, wherein when the key is pressed, the coding circuit generates a corresponding character signal, and the signal sending module converts the character signal into a radio signal and sends the radio signal;

a receiving module, used for receiving the radio signal and transmitting the radio signal to the PC, wherein a USB module of the receiving module further comprises a clock control pin, and is electrically connected to the PC; and an embedded controller, disposed in the PC, the embedded controller electrically connected to the receiving module via the clock control pin, and used for sending a corresponding function trigger signal to a south bridge chip set according to a pressing time of the received radio signal.

2. The multifunctional USB wireless keyboard according to claim 1, wherein the USB is a mini-A type or a mini-B type.

3. The multifunctional USB wireless keyboard according to claim 1, wherein the control function is restoration function of a basic input-output system (BIOS) in the PC, a data deletion function in a complementary metal-oxide-semiconductor (CMOS), or a power-on function.

* * * * *